United States Patent [19]
Ward

[11] 4,456,578
[45] Jun. 26, 1984

[54] METHOD AND APPARATUS FOR PRODUCING A FRICTION ELEMENT FOR A DISC BRAKE

[75] Inventor: Melvyn Ward, Worcestershire, England

[73] Assignee: Lucas Industries, Birmingham, England

[21] Appl. No.: 411,842

[22] Filed: Aug. 26, 1982

[30] Foreign Application Priority Data

Sep. 3, 1981 [GB] United Kingdom ............... 8126682

[51] Int. Cl.³ .............................................. B22F 3/14
[52] U.S. Cl. .......................................... 419/8; 419/52; 425/174.6
[58] Field of Search .................. 419/52, 8; 425/174.6, 425/DIG. 13; 264/DIG. 45, 45

[56] References Cited

U.S. PATENT DOCUMENTS

| | | | |
|---|---|---|---|
| 2,180,988 | 11/1939 | Lemmers et al. | 419/52 |
| 2,195,297 | 3/1940 | Engle | 419/52 |
| 3,891,398 | 6/1975 | Odier | 419/6 |
| 3,946,192 | 3/1976 | Allen et al. | 419/52 |
| 4,147,488 | 4/1979 | Chiron | 425/174.8 G |

FOREIGN PATENT DOCUMENTS

| | | |
|---|---|---|
| 971387 | 9/1964 | United Kingdom . |
| 1460592 | 1/1977 | United Kingdom . |
| 1557034 | 12/1979 | United Kingdom . |

*Primary Examiner*—Brooks H. Hunt
*Attorney, Agent, or Firm*—Holman & Stern

[57] ABSTRACT

A friction element for a motor car or motor cycle disc brake is produced by pressing a powdered friction material in a die cavity using first and second resistance heating electrodes. The friction material is thereby sintered and bonded to a backing plate which closes one end of the die cavity. The first electrode has a backing plate-engaging end surface formed with a recess therein which is partly filled by a graphite insert which is less electrically conductive than the remainder of the first electrode. The second electrode may have a similar insert therein and may either engage the friction material directly or through the intermediary of a graphite sub-electrode. In this way, a good electrical contact between the friction material and the electrode and a uniform current flow through the material can be obtained.

16 Claims, 18 Drawing Figures

METHOD AND APPARATUS FOR PRODUCING A FRICTION ELEMENT FOR A DISC BRAKE

BACKGROUND OF THE INVENTION

1. Field of the Invention

This invention relates to a friction element for a motor car or motor cycle disc brake and more particularly to a method and apparatus for producing such a friction element.

2. Description of the Prior Art

As shown in FIGS. 1a and 1b of the accompanying drawings, a friction element for a motor cycle disc brake conventionally includes an irregular-shaped backing plate 9 which is typically formed of mild steel and which supports a single, sintered friction pad 10 typically having a cross-sectional area of the order of 1800 mm$^2$. By way of contrast, a friction element for a tractor disc brake conventionally includes a generally circular backing plate supporting a plurality of angularly spaced friction pads which are positioned adjacent the periphery of at least one major surface of the plate and each of which typically has a cross-sectional area of only about 130 mm$^2$. In each case, the or each friction pad is normally composed of a sintered friction mixture which may contain copper, nickel, iron or aluminium as its major ingredient together with a variety of additives to improve the properties of the pad.

At the present time, friction elements for motor cycle disc brakes are normally produced by cold-compacting the powdered friction material into a preform and then, after locating the preform in position on the backing plate, furnace sintering the preform under pressure so as to sinter the preform into the required pad and bond the pad to the backing plate. In the case of a mild steel backing plate and a copper-based friction pad, satisfactory bonding can only be achieved at the temperatures involved in the furnace sintering operation (i.e. 700°–900° C.) if the backing plate is precoated normally by electrolytic plating, with a layer of a bonding aid, such as nickel or copper, the coating typically being between 0.01 and 0.025 mm thick. Although the inclusion of this precoating step enables the furnace sintering process to produce satisfactory friction elements, the process suffers from a number of practical disadvantages, in particular high capital cost and space requirements. A further disadvantage is that, due to the considerable time at an elevated temperature, the backing plate becomes annealed.

In the field of tractor disc brakes, it is known not only to use furnace sintering, but also electrical resistance heating (see British Pat. No. 1,460,592), to sinter and bond preformed friction pads to a backing plate. Moreovoer, although resistance sintering of conventional copper-based friction pads to a mild steel backing plate still requires pre-plating of the backing plate with a bonding material, such as copper or nickel, the resistance heating technique has been found to produce satisfactory friction elements without the high capital cost and space disadvantages of the furnace sintering route.

BRIEF SUMMARY OF THE INVENTION

In view of these advantages, the inventor has now investigated the application of the above-mentioned resistance sintering technique to the production of friction elements for motor car and motor cycle disc brakes. This technique involves urging respective electrodes into electrical contact with the backing plate and the preformed friction pad and then passing an electrical current between the electrodes so that, by virtue of its electrical resistance, the friction pad is sintered and bonded to the backing plate. However, as a result of this investigation, the following problems have been revealed:

(a) In view of the large cross-sectional area of the required friction pad, it was difficult to achieve good contact between a preformed friction pad and its associated electrode over the full surface area of the preform.

(b) The electrical current used to effect the resistance heating was found to flow non-uniformly through the friction pad material so that, for example, using a d.c. supply, the current tended to tunnel through the center of the pad. As a result, there was a varying degree of sintering of the friction pad in a direction transverse to the direction of current flow.

(c) For the same reason as in (a) above it was difficult to achieve good and consistent contact between the backing plate and its associated electrode without an undesirable increase in the pressure applied to the electrode.

An object of the present invention is therefore to provide an improved method of producing a friction element for a motor car or motor cycle disc brake using electrical resistance heating.

Accordingly, the invention resides in a method of producing a friction element for a motor car or motor cycle disc brake, the friction element including a sintered friction pad bonded to an electrically conductive backing plate and the method comprising the steps of:

(a) introducing a powdered friction material which, on sintering, will produce the required friction pad into a die cavity defining the shape of the pad, the die cavity being closed at one end by the backing plate and the friction material contacting one major surface of the backing plate, (b) engaging a first resistance heating electrode with the other major surface of the backing plate, the first electrode contacting the backing plate through an end surface of the electrode which is formed with a recess which is at least partly filled by an insert formed of a material which is less electrically conductive than the remainder of the first electrode, (c) introducing a second resistance heating electrode into the die cavity so that the powdered friction material is contained between, and is an electrical contact with, the first and second electrodes, (d) causing the first and second electrodes to undergo movement relative to and towards each other so as to compress the friction material in the die cavity against the backing plate, and (e) simultaneously with step (d) passing an electric current between the electrodes through the backing plate and the friction material to sinter the friction material into the required friction pad and bond to pad to the backing plate.

Also according to the present invention, there is provided apparatus for producing a friction element for a motor car or motor cycle disc brake, the friction element including a sintered friction pad bonded to an electrically conductive backing plate, said apparatus comprising a die cavity defining the shape of the pad and having one end which is arranged to be closed by the backing plate; a first resistance heating electrode which is arranged to engage with an opposite major surface of the backing plate to that which faces the die cavity; and a second resistance heating electrode having an end surface which is engageable in an opposite end of the die cavity to that which is closed in use by the backing plate, the first and second electrodes being movable relative to and towards each other so as to compress powdered friction material when in the die cavity whilst a current is passed between the electrodes to sinter the friction material into the required pad and bond the pad to the backing plate; wherein the first electrode has a backing plate-engaging end surface with a recess therein and wherein the recess is at least partially filled by an insert formed of a material which is less electrically conductive than the remainder of the first electrode.

The provision of the friction material on the backing plate as a powder contained within a die cavity, rather than precompacting the material into a preform, ensures that there is good electrical contact between the friction material and the second electrode over the full working surface of the second electrode. Further, by providing said end surface of the first electrode with a recess at least partly filled by a less conductive insert, it is possible to suppress current flow through a predetermined region of the friction material and thereby improve current distribution during step (e). In this respect, it is to be appreciated that the recess with the insert is provided in the region of the first electrode through which there would otherwise be preferential current flow during resistance heating. Thus, in the preferred example of a d.c. current being used for step (e), the recess with the insert would be arranged at a generally centrally disposed location in said end surface of the first electrode. By way of contrast, in a case of an a.c. current being used to effect step (e) the recess with the insert would be provided adjacent the periphery of said end surface of the first electrode because of the so-called "skin effect" which occurs when a.c. current is used.

The skin effect would be expected to be pronounced when using high power a.c. and large conductors as in the present application. It is considered that, with any power source, the most effective heating would result from the passage of current through a path roughly midway between the pad center line and the periphery of the die cavity. This would be a compromise between overheating of the center resulting from a central current path and excessive loss to the die resulting from a peripheral current path. The insert will be preferably positioned to produce the most effective heating bearing this in mind.

In order that the insert may fulfil its required function of suppressing current flow through a predetermined region of the friction material, it is merely necessary that the insert has a lower electrical conductivity than the remainder of the first electrode. However, from a practical view point, it is desirable that there is a substantial difference in the respective conductivities of the insert and the remainder of the electrode and in particular that the ratio of the electrical resistance of the insert to that of the remainder of the first electrode is greater than 100:1. In view of this requirement and the need for the insert to exhibit satisfactory thermal stability and thermal shock resistance, preferred materials for the insert are graphite, silicon nitride and a silicon aluminium oxynitride ceramic material obeying the general formula:

$$Si_{6-z}Al_zN_{8-z}O_z$$

where z is greater than 0 and less than or equal to 5.

In addition, it is preferable that the insert only partly fills said recess in said end surfaces of the first electrode and in particular that the insert terminates just short of said one end surface of the first electrode. This serves two purposes; (1) the area of contact between the first electrode and the backing plate is reduced which in turn increases the contact pressure therebetween. Thus, even with a relatively low pressure being applied during step (d), it is possible to ensure consistent and adequate electrical contact between the first electrode and the backing plate, even if the backing plate exhibits minor surface irregularities, and (2) it is possible to minimise deformation of the backing plate during the resistance sintering operation while at the same time avoiding the possibility of the first electrode only contacting the backing plate by way of the insert. Such contact can result in excessive, localized heating of the backing plate if the insert is formed of a material having a high electrical resistance, it may in some cases be desirable to provide an annular groove around the edge of the insert thereby reducing any tendency for preferential current flow through the edge regions of the insert.

One or more further recesses may be provided for the purposes defined above. Such further recesses may take the form of grooves which may lie outwardly of the first mentioned recess. At least one of the further recesses may be a continuous, preferably annular, groove surrounding the first-mentioned recess and/or one or more discrete recesses may be provided. Such further recesses may or may not contain inserts respectively.

The use of a central recess alone is limited to cases where the required effect can be produced with a recess size which does not allow distortion of the back plate.

It will be appreciated that the required arrangement of groove(s), recess(es) and insert(s) is a complex compromise between thermal conductivity, electrical conductivity and mechanical support.

The thickness of the friction pads to be produced is normally between 3 mm and 7 mm. As the required thickness increases within this range, it may be found that the preferential current flow suppressed by the insert in the first electrode is reinstated at or adjacent the second electrode. This can lead to non-uniform sintering of the region of the friction mixture remote from the backing plate. In order to minimise this problem, the second electrode is preferably formed in its end surface presented to the friction mixture with a recess which is located in a similar position to, preferably in alignment with, the recess in the first electrode and which is filled by a further insert formed of a material having a lower electrical conductivity than that of the second electrode. Again, the ratio of the electrical resistance of the further insert to that of the remainder of the second electrode is preferably greater than the second electrode. Again, the ratio of the electrical resistance of the further insert to that of the remainder of the second electrode is preferably greater than 100:1. In the case of the further insert, it is to be appreciated that this should completely fill the recess in the second electrode.

As an alternative, or in addition, to the further insert in the second electrode, it may be desirable particularly in cases where the thickness of the friction pads decreases within the above-defined range, to arrange that the second electrode makes electrical contact with the friction material by way of a sub-electrode which is separate from the second electrode and which is formed of a material having a higher electrical resistance than the second electrode. The provision of a sub-electrode increases the total electrical resistance and hence reduces the current required to produce a given resistance heating effect. Moreover, by acting as a heating element, the sub-electrode facilitates the sintering of a wide range of friction materials and is of particular value when the material has a low inherent resistance. In addition, by suitable choice of the material of the sub-electrode it is possible to reduce any tendency for the friction material to become brazed to the second electrode during the resistance sintering operation, particularly where the second electrode contains copper. Friction materials likely to be prone to brazing are those containing a substantial quantity of liquid phase material, particularly Sn and Al, for example material B mentioned hereinafter.

The ratio of the electrical resistance of the sub-electrode to that of the second electrode is typically greater than 50:1. The preferred material for the sub-electrode is graphite.

It is to be appreciated that any suitably temperature-resistant die material known per se is satisfactory for the production of friction materials according to the present invention, providing that its electrical and thermal properties remain substantially constant throughout the heating stage. However, in order to allow volume production of low cost components with accurate dimensions, it is important that the material used to produce the die, in which the die cavity is defined, is readily formable, is of reasonable cost, has good thermal shock resistance, abrasion resistance and thermal stability, and has a sufficiently high electrical resistance to prevent the current by-passing the workpiece. From these view points, it is preferred that the die material is hot pressed silicon nitride or a hot pressed or upon sintered ceramic material containing at least 90% of a silicon aluminium oxynitride obeying the general formula:

$$Si_{6-z}Al_zN_{8-z}O_z$$

where z is greater than 0 and less than or equal to 5.

The material used to produce the backing plate is not critical, provided the backing plate is electrically conductive and has sufficient strength to support the friction pads in service. From a cost point of view, the backing plate will normally be formed of steel, preferably mild steel, although other materials such as copper and nickel can be used where they are not precluded by cost. Using a mild steel backing plate with a conventional copper-based friction mixture, requires the backing plate to be pre-coated with a bonding material, such as nickel or copper, in order to ensure satisfactory bonding of the pads to the backing plate during the resistance sintering operation. It has, however, been found that excellent bonding of copper-based friction pads to mild steel backing plates can be obtained when only a very thin deposit (1-2 microns thick) of a bonding material is provided on the backing plate by, for example, electroless nickel plating. This contrasts with the 0.01-0.025 mm thick coating normally required on a mild steel backing plate when furnace sintering is used to bond a copper-based friction pad to the plate. In the resistance sintering process of the invention, it is believed that the very thin deposit of the bonding material rapidly diffuses into the friction material during sintering, whereafter a true metallurgical bond is formed between the metallic matrix of the friction material and a chemically clean ferrous surface of the backing plate.

It has been found that, when plates are cleaned with an aqueous blasting technique, a typical surface roughness of 0.8-1.3 microns CLA (center line average) is obtained and plating is necessary to ensure a reliable bonding. However, when a dry coarse blasting process was used to produce a surface roughness of 7.7 to 8.7 microns CLA, it was found that most materials would bond, in particular those containing a liquid phase (see Example 3 hereinafter). This was attributed to the larger surface area, cleaner surface resulting from the dry process, and the presence of a cold-worked layer which recrystallized during sintering, thus assisting in obtaining a diffusion bond. Microscopic examination of the bond has shown that even with Sn present, substantial areas of the joint consist of resistance welds rather than resistance brazes. However, use of plated backplates ensures consistency of bonding after variable periods of storage.

In the method of the invention, the current used to effect step (e) and the time for which the current is passed are of the same order as those employed in conventional resistance sintering techniques. Thus, for example, the current employed is typically 10,000-100,000 amps, the current density is 5.4-54 amps/mm² and the heating time is up to 15 seconds. It will, however, be appreciated that the precise values used in practice will depend on such parameters as the composition of the friction material and the thickness of the required friction pads. In general, however, it is preferred that the resitance sintering current is d.c. rather than a.c. Previous experience has shown that high initial peak voltages obtained with a.c. may lead to uncontrolled breakdown of resistance within the workpiece.

The material of the electrodes is not critical and again electrode materials used in conventional resistance sintering techniques can be employed. Thus, for example, a suitable material for the working tip of each electrode is a copper/tungsten alloy, although to avoid the problem of brazing of the second electrode to the friction pad (when the sub-electrode is absent) it may in some cases be desirable to use copper-free electrodes, for example, an alloy of tungsten with iron, nickel and molybdenum.

BRIEF DESCRIPTION OF THE DRAWINGS

In the accompanying drawings.

DETAILED DESCRIPTION

Figure 1A:
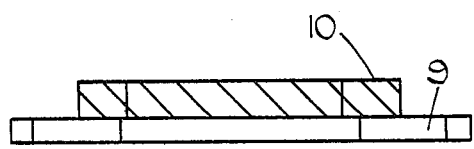
FIGS. 1a and 1b are side and plan views respectively of a friction element of a motor cycle disc brake.

In the following description, reference is made to examples of powdered friction materials designated as Materials A to I. These have the following approximate compositions in percent by weight:

Material A
  copper—68.9; tin—5.8; lead—8.6; graphite—8.8; silica—2.8; alumina—4.9.

Material B
  copper—70; tin—9.1; lead—3.0; graphite—8.5; silica—1.0; silicon nitride—8.3.

Material C
  copper—69; tin—9.0; lead—2.9; graphite—8.4; silica—1.0; alumina—9.7.

Material C1
  As Material C, but using fine reactive alumina powder instead of coarse calcined alumina powder as used in Material C.

Material D
  Copper—78.1; lead—2.8; graphite—8.2; alumina—10.9.

Material E
  Copper—66.9; aluminium—7.4; lead—3.3; graphite—9.6 alumina—12.8.

Material F
  Copper—43.2; steel fibre—33.9; lead—2.9; graphite—8.6; alumina—11.4.

Material G
  Copper—65.8; graphite—9.7; silica—10.4; alumina—11.3; molybdenum disulphide—2.5.

Material H
  Steel fibre—75.9; lead—3.1; graphite—9.0; alumina—12.0.

Material I
  Copper—33; iron—45; lead—1.1; graphite—9.8; silica—10.1; alumina—1.4.

Referring to FIGS. 1 and 3 to 5, the apparatus used in said one example comprises a die 11 formed of hot pressed silicon nitride, or more preferably, an open sintered ceramic material containing at least 90% of a silicon aluminium oxynitride obeying the general formula:

$Si_{6-z}Al_zN_{8-z}O_z$ where Z is greater than 0 and less than or equal to 5. The die 11 is conveniently produced in segments which are retained as a taper interference fit in an outer water jacket 12 so as to define a generally rectangular die cavity 13 which conforms to the shape of the required friction pad 10.

At one end, which in practice would define the top of the die, the die 11 is provided with a flat and smooth surface finish such that an oversize backing plate 9 can be used to seal said one end of the die cavity 13. The die 11 floats on springs (not shown) or air cylinders (also not shown) so that, in use, when a charge of a powdered friction material 14 is received in the die cavity 13, a force can be applied to the backing plate 9 by a first electrode 15 to urge the backing plate and the die towards a second electrode 16 received in the die cavity. The powdered friction material 14 is thereby compressed against the backing plate 9 so that, by passing an electric current between the electrodes 15, 16, the friction material can be sintered into the required friction pad 10 and the pad bonded to the backing plate 9.

FIGS. 2(a) to 2(e) show alternative shapes of backing plate to that shown in FIG. 1 (b). The present invention is applicable to friction elements having backing plates of any of these shapes.

Figure 4A:
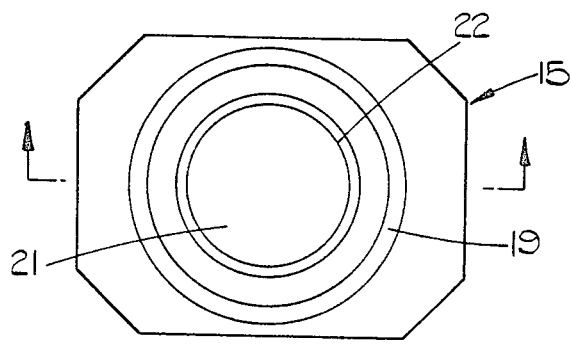
FIGS. 4a and 4b are plan and cross sectional views respectively of the first electrode of the apparatus shown in FIG. 3, FIGS. 5a and 5b are plan and cross sectional views respectively of the second electrode of the apparatus shown in FIG. 3, FIGS. 6a and 6b, are views similar to FIGS. 5a and 5b respectively of an alternative form of second electrode, for use with the first electrode of FIGS. 4a and 4b, FIGS. 7a and 7b are views similar to FIGS. 4a and 4b of an alternative form of first electrode for use with the second electrode of FIGS. 6a and 6b.
Figure 4B:
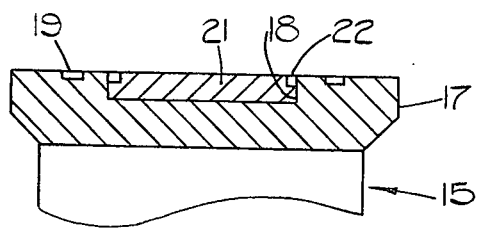

As shown in FIGS. 4a and 4b, the first electrode 15 includes a working tip 17 which is formed at its free end surface (ie that surface which is to engage the backing plate 9 in use) with a centrally disposed, generally circular recess 18 and a further recess in the form of an annular groove 19 concentric with, and external to, the recess 18. Apart from the recess 18 and groove 19, the free end surface of the tip 17 is machined so as to be flat and smooth. Mounted as an interference fit in the recess 18 is a circular graphite insert 21 which is arranged to terminate short of the free end surface of the tip 17 by a distance of about 0.1 mm. At its outermost surface, the periphery of the insert 21 is cut-away to define with the wall of the recess 18 a further groove 22 concentric with the groove 19. In one practical embodiment, the tip 17 was formed of a copper/tungsten alloy sold by Johnson Matthey as type 10W3 and had a resistivity of 5 micro ohm cm. In this embodiment the recess 18 had a diameter of 28 mm and a depth of 3.5 mm and received an insert 21 formed of Fordath EC3 graphite having a resistivity of 1680 micro ohm cm. Thus the ratio of the resistance of the insert 21 to the resistance of a corresponding length of the remainder of the electrode tip 17 was of the order of 1,000:1. The groove 19 in said one practical embodiment was 0.5 mm deep and had an external diameter of 46 mm and an internal diameter of 40 mm, whereas the groove 22 was 1 mm deep and had an external diameter of 28 mm and an internal diameter of 26 mm.

Figure 5A:
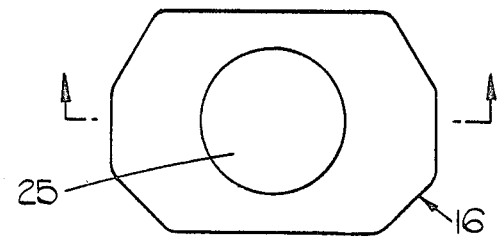
Figure 5B:
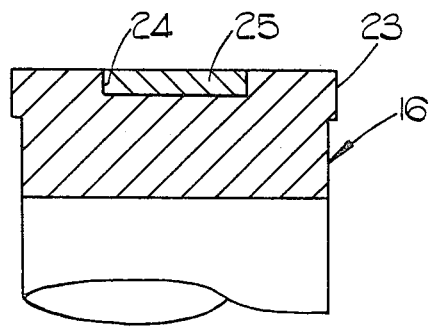

As shown in FIGS. 5a and 5b, the second electrode 16 includes a working tip 23, which in said one practical embodiment was formed of an alloy of 90% tungsten with iron, nickel and molybdenum as sold by Johnson Matthey as type M4000 and having a resistivity of 13 microhm.cm At its free end surface (ie the surface presented to the friction material), the tip 23 is planar and smooth apart from a centrally disposed, circular recess 25 which in said one practical embodiment had a depth of 3 mm and a diameter of 24 mm. Mounted as an interference fit in, and filling, the recess 24 is a graphite insert 25, which in said one practical embodiment was formed of the same Fordath material as the insert 21. Thus, in said one practical embodiment the ratio of the resistance of the insert 25 to the resistance of an equal length of the remainder of the electrode tip 23 was of the order of 370:1. The electrode tip 23 is of the same generally rectanular cross section as the required pad 10 and is stepped inwardly by about 0.5 mm at a short distance (3 mm in said one practical embodiment) from its free end so as to avoid wedging of the electrode 16 in the die 11 as a result of non-release of flash produced in previous resistance sintering operations.

Figure 3:
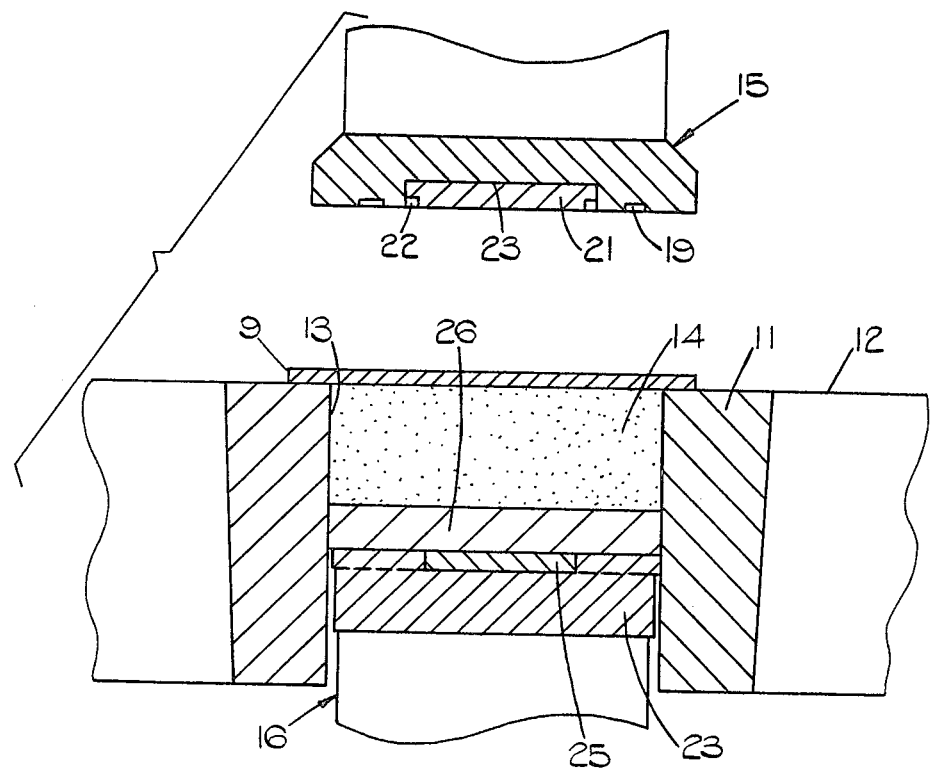
FIG. 3 is a cross sectional view of apparatus for producing the friction element shown in FIG. 1 by a method according to one example of the invention.

As shown in FIG. 3, the apparatus used in said one example includes a sub-electrode 26 which is mounted in the die cavity 13 on the free end surface of the second electrode tip 23, but is formed separately from the tip 23. The sub-electrode 26 conforms to the shape of the die cavity 13 and in said one practical embodiment was formed of a 4 mm thick block of Fordath EC3 graphite.

The precise resistance of the sub-electrode was not found to be critical. However, from a practical point of view, the preferred resistance lies in the range 5-50 microhms.

The examples of Fordath graphite used herein have the following resistance characteristics:

| Grade | Thickness(mm) | Resistance(microhm) |
|-------|---------------|---------------------|
| EC3   | 4             | 36                  |
|       | 2.8           | 25                  |
| EC6   | 4             | 23                  |
|       | 3             | 17                  |

The sub-electrode can generate a temperature gradient within the mixture being sintered such that the temperature is high at the sub-electrode face and decreases towards the first electrode. However, we have found that variations in the microstructure caused by this effect does not affect the frictional properties of the sintered material.

The invention will now be more particularly described with reference to the following practical examples.

EXAMPLE 1

A 4.5 mm thick mild steel backing plate was initially degreased and then subjected to a dry gritting or shot blasting operation. The plate was then washed by dipping in water and then cleaned in a 5% hydrochloric acid solution for 1-2 minutes before being subjected to a further water dip. Thereafter the plate was electroless nickel plated at 85° C. for 2-3 minutes using a IMA-SA4181 as the electrolyte. After removal from the electrolyte, the plate was washed for approximately 1 minute in water and dried. If it was necessary to store the plate before subsequent processing, storage was effected in a sealed environment containing a dessicant.

Using the apparatus of said one practical embodiment, a charge of powdered friction material A as described above was introduced into the die cavity 13 (having a cross-sectional area of 1840 mm$^2$) on top of the sub-electrode 26 which was EC3 having a thickness of 4 mm.

Said one end of the die cavity was then closed by the nickel-coated backing plate and the first electrode 15 was then urged against the backing plate with an applied pressure of 0.35 t.s.i. (5407 KPa) thereby to compress the friction material between the backing plate and the electrode 16 and sub-electrode 26. Simultaneously a current of 22×10$^3$A was passed between the electrodes from a 300 KVA 3-phase d.c. supply to sinter the friction material. The current and pressure were maintained for 8 seconds during which time the current rose to a final value of 38×10$^3$A. Passage of current was then terminated and the assembly allowed to cool under pressure. In the resultant friction element, the pad 10 was found to have a thickness of 4.6 mm and a relative density of 87.7%.

EXAMPLE 2

The process of Example 1 was repeated but with the sub-electrode 26 being removed. In this case, the initial current passed between the electrodes was 23×10$^3$A and rose during the 8 seconds of the resistance sintering step to 43×10$^3$A. The applied pressure was again 0.35 t.s.i. (5407 KPa) and, after cooling under pressure, the resistance sintered pad 10 had a thickness of 4.77 mm and a relative density of 87.1%.

EXAMPLE 3

The heating effect is proportional to the resistance of the material being sintered, amongst other factors. For some materials, it has been found to be advantageous to use a second applied pressure greater than the first and activated after some time t during the heating cycle. The first pressure could then be maintained at a level to optimize resistance heating during the first stages of sintering, whilst the required final density is obtained largely by appropriate control of the second applied pressure. This is particularly advantageous where a high final density is required. Where a low final density is required it is advantageous to omit the second pressure but retain a low first pressure to maximize resistance heating, a low density being achieved by using a short process time. In addition, it is advantageous to minimize heating by the sub-electrode to reduce the temperature gradient through the thickness of the material.

In this Example, Example 1 was repeated with charges of Material B whilst varying current, time and first and second pressure to produce friction pads of varying densities, as shown below:

| Example | 3a | 3b | 3c | 3d | 3e | 3f |
|---------|-----|-----|-----|-----|-----|-----|
| Sub-electrode type. | EC6 | EC3 | EC3 | EC3 | EC3 | EC3 |
| Sub-electrode thickness. | 3mm | 4mm | 4mm | 4mm | 4mm | 4mm |
| Total time (secs) | 6 | 7 | 11 | 11 | 7 | 6 |
| 1st pressure (KPa) | 2758 | 2758 | 5517 | 5517 | 2758 | 5517 |
| 2nd pressure (KPa) | 0 | 19310 | 11034 | 0 | 19310 | 0 |
| Time t (secs) | — | 3 | 3.4 | — | 3 | — |
| Current (KA) | — | 27-39 | 28-35 | 28-33 | 26-37 | 18-25 |
| Initial Resistivity (milliohm.cm) | 40 | 40 | 15 | 15 | 40 | 55 |
| Final density % | 72.6 | 91.2 | 85.0 | 83.0 | 90.5 | 74.3 |
| Final thickness (mm) | 4.89 | 5.04 | 4.92 | 4.88 | 5.10 | 4.85 |

Satisfactory bonds between the friction material and the backing plates were obtained with all of Examples 3a to 3f, the backing plates of Examples 3a and 3b being plated and the backing plates of Examples 3c to 3f being dry coarse blasted and unplated.

Figure 8:
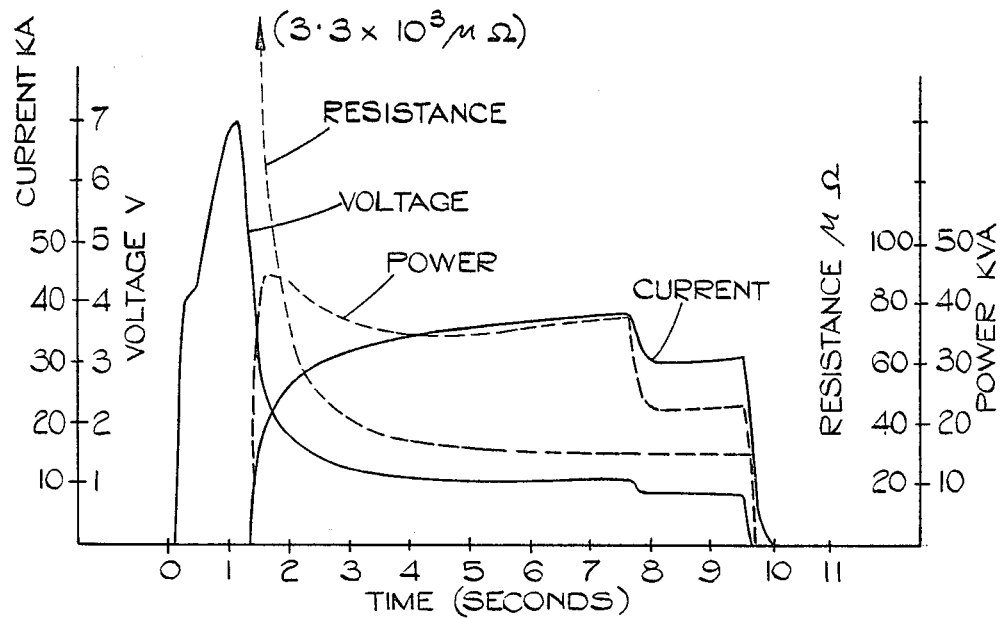
FIG. 8 is a graph plotting variously current, voltage, resistance and power against time in respect of a resistance sintering operation on a typical friction material.

It will be noted from Example 3 above that initial resistivities have been given for each of Examples 3a to 3f. Initial resistivity is one important parameter in determining initial processing characteristics such as current distribution and heating effects in the early stage of sintering. The graph of FIG. 8 gives an indication of the electrical parameters (Voltage, Current, Power and Resistance), and their variation with time during the sintering of a typical brake pad by the process of this invention. It is obvious that although resistance decreases rapidly, resistance heating is most efficient initially as shown by the power peak corresponding to a low but increasing initial current.

If the initial resistivity is too high, then the open circuit voltage will be either insufficient to breakdown the overall resistance of the material or more likely, breakdown will be local only. The consequent artificially high current density can cause local melting. Therefore knowledge of the resistivity of the powder material is desirable primarily to determine whether a material will breakdown uniformly but also to provide some indication of the initial process parameters required to effect uniform sintering.

Powder resistivity can be determined by placing a sample of powder material in a suitable electrically insulating die, between two electrodes formed from M4000 alloy. A constant DC current is passed through the sample and resistivity is derived at various applied pressures by noting the voltage drop across the sample and noting sample thickness.

Figure 9:
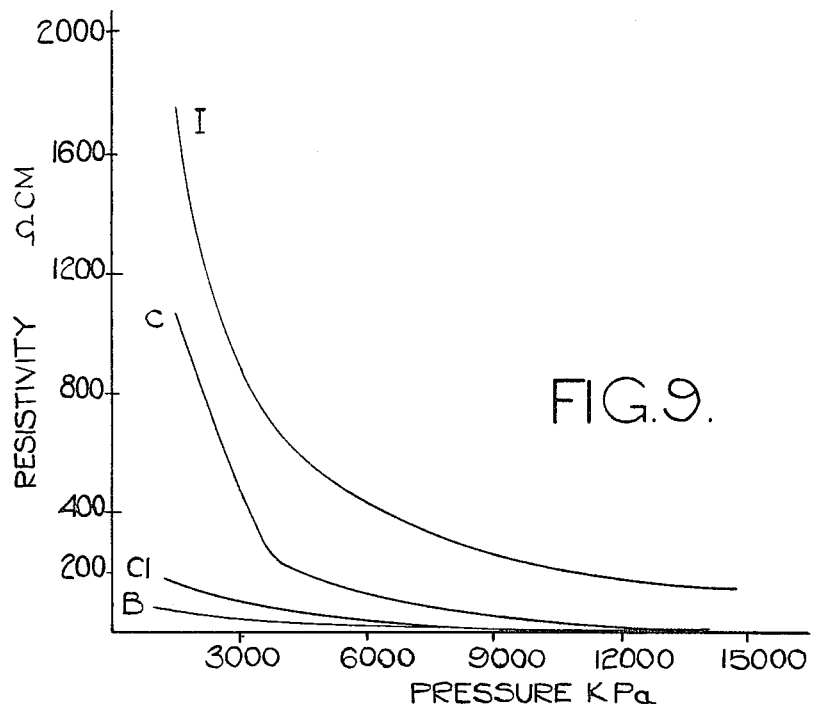
FIG. 9 is a graph plotting resistivity against pressure for various friction materials.

Typical results obtained for materials C, CL, B, and I are shown in FIG. 9.

It is evident that resistivity can be manipulated by varying applied pressure, and hence density, composition and the morphology of the powder components contained within the material. Hence it is possible to adjust the initial resistivity of the powder material to obtain initially uniform sintering. However due regard must be paid to other complicating factors such as the required applied pressure producing an undesirable density; frictional performance of the sintered pad is also known to be dependent upon its composition.

It has been found that, with the process of the present invention, it is preferred to use an initial resistivity lower than 200 Milliohm cm to ensure controlled current distribution.

With reference to FIG. 9, it was found that resistivity of material I could be barely reduced to this level even at the highest applied pressure. Consequently it would not sinter in a controlled manner without a change in composition or particle morphology. Again referring to FIG. 9, it can be seen that although material C had a high resistivity at low pressures, this could be reduced to a useful level at moderate pressures eg. at 1000 psi (6897 KPa), resistivity is 80 milliohm cm. This is further elaborated in Example 4.

EXAMPLE 4

Figure 6A:
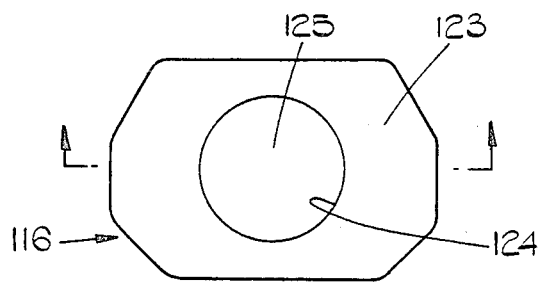
Figure 6B:
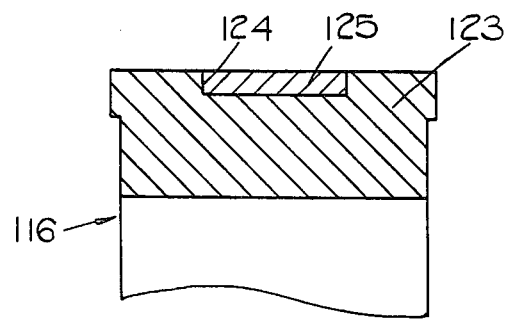

The second electrode of the preceding Examples (ie. that of FIGS. 5(a) and 5(b)) was replaced by that shown in FIGS. 6(a) and 6(b). Geometrically similar to that of FIGS. 5(a) and 5(b), the second electrode 116 of FIGS. 6(a) and 6(b) had a tip 123 formed of a Cu-W alloy. (Matthey 10W3). The tip 123 had a centrally disposed circular recess 124 thereon of a diameter of 24 mm and a depth of 3.5 mm. The recess 124 was completely filled with an insert 125 of Fordath EC3 graphite.

A sub-electrode 26 also of EC3 graphite, 4 mm thick was used with this arrangement to process a charge of friction material C. With the aid of FIG. 8, the process will be described in greater detail.

A charge of material C was placed in the die cavity by sweep filling. The cavity was closed with a plated backplate of the shape illustrated in FIG. 1(b). An initial pressure of 1000 psi (6897 KPa) was applied to the workpiece via the movable first upper electrode 15 to produce a resistivity of 80 Milliohm cm in the powder mixture.

Power was supplied in three consecutive stages:

1. An open circuit voltage sufficient to breakdown initial resistance was applied. In this example breakdown occurred at 7 volts, after which resistance fell rapidly, current increases to approximately 20 KA and power reached a peak value.

2. In the second stage, the maximum power input was limited to prevent overheating and current rose gradually to 38 KA. Resistance stabilised during this period.

3. The third stage used a reduced power input with the current reduced to 30 KA to reduce the initial cooling rate and reduce thermal shock.

The total process time was approximately 10s and the resultant pad had a sinter weight of 47 g, a relative density of 82.7% and a sinter thickness of 4.88 mm.

Using the same arrangement, material B was sintered and bonded to various backplates as follows:

| Backplate (illustrated FIG. 2) | P1 KPa | P2 KPa | Time 't' s | Total time s | Initial Resistivity Milliohm cm | Sinter weight g. | Sinter thickness mm. | Sinter density %. | Current KA |
|---|---|---|---|---|---|---|---|---|---|
| (i) 2a | 5517 | 11034 | 3.4 | 11 | 15 | 48.6 | 4.97 | 85.2 | 30–39 |
| (ii) 2e | 5517 | 11034 | 3.4 | 11 | 15 | 49.1 | 5.01 | 85.4 | 28–38 |
| (iii) 2d | 6897 | — | — | 10 | 12 | 46.4 | 4.84 | 83.3 | 31–38 |
| (iv) 2b | 6897 | — | — | 10 | 12 | 46.5 | 4.86 | 83.3 | 32–38 |
| (v) 2a | 6897 | — | — | 9 | 12 | 46.5 | 4.85 | 83.5 | 29–36 |

Figure 1B:
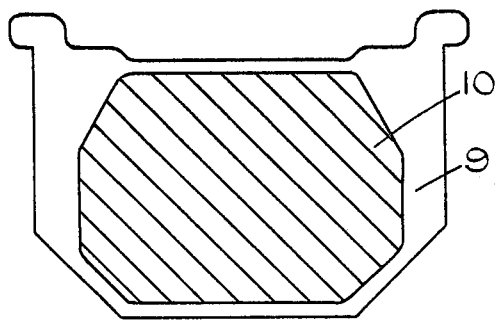
Figure 2A:
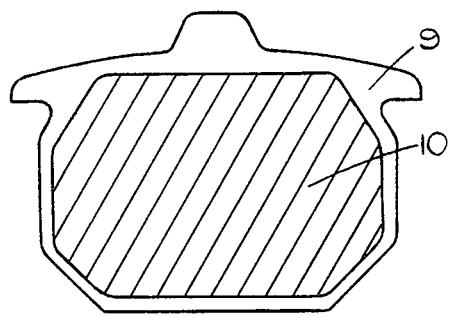
FIGS. 2(a) to 2(e) are views similar to FIG. 1b showing friction elements having other shapes of backing member.
Figure 2B:
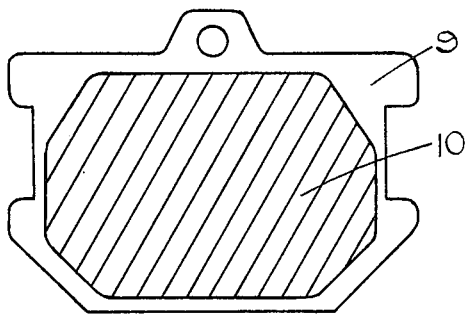
Figure 2C:
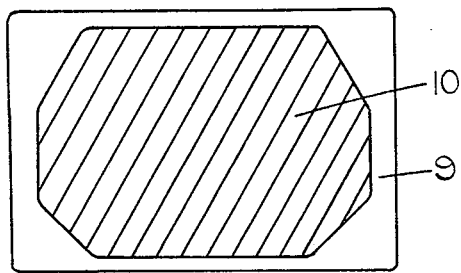
Figure 2D:
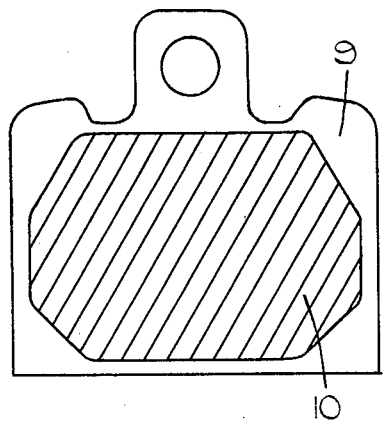
Figure 2E:
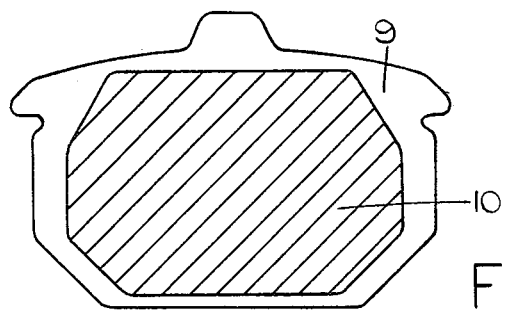

In addition, 10 samples were produced using material B and the backplate of FIG. 1(b) under similar conditions to demonstrate reproducibility. Results were as follows:

Sinter weight: 48.4–49.4 g.
Sinter thickness: 4.92–5.12 mm
Sinter density: 83–86.9%

It will be seen that a relatively narrow spread of results was obtained.

EXAMPLE 5

Figure 7A:
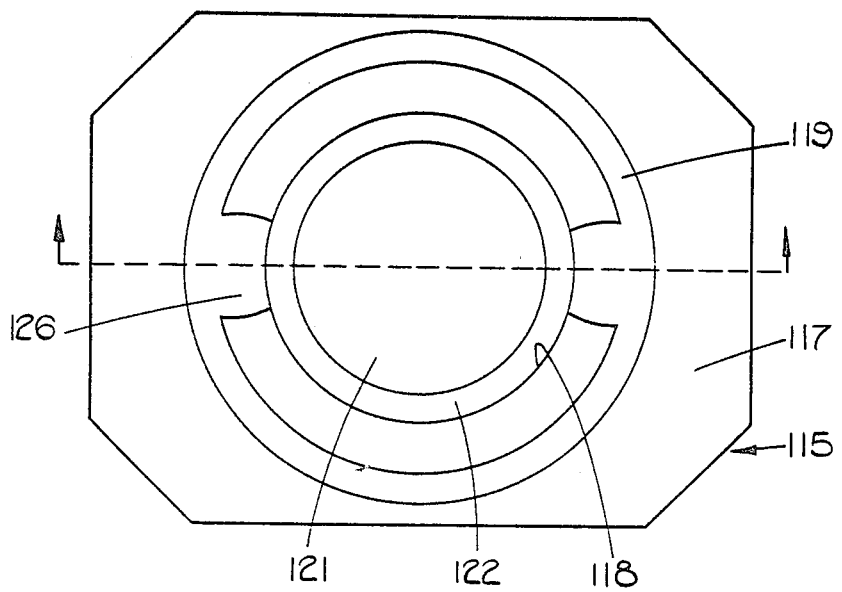
Figure 7B:
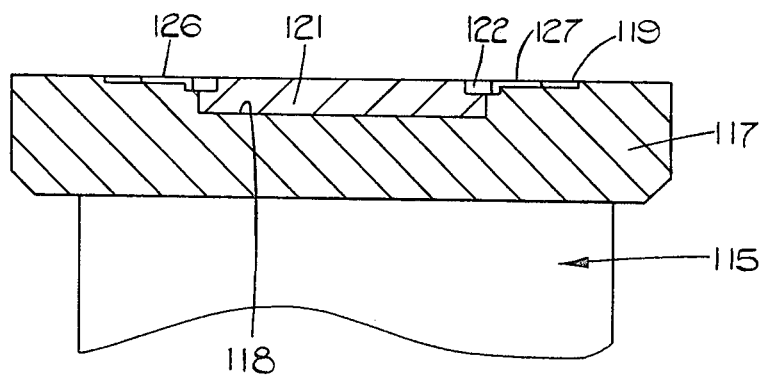

The first electrode used in the previous Example (ie that of FIGS. 4(a) and 4(b) was replaced by that illustrated in FIGS. 7(a) and 7(b). Such an electrode 115 is formed of Cu-W alloy (MATTHEY IOW3). A working tip 117 of the electrode 115 has a free end surface having a centrally disposed circular recess 118 (diameter 28 mm) in which a graphite insert 121 (FORDATH EC3) is an interference fit. The electrode 115 has an inner annular groove 122 defined partly by a shallower recessed portion around the periphery of the recess 118 and partly by a recessed portion around the periphery of the insert 121. The groove 122 has a width of 3 mm, a depth of 1 mm and an inner diameter of 24 mm. The free end surface of the tip 117 also has an outer annular groove 119 has a width of 3 mm, a depth of 0.5 mm and an inner diameter of 40 mm. The grooves 119 and 122 are interconnected at diametrically opposed locations on the long axis of the free end surface of the tip 117 by a pair of part circular slots 126 and 127 of 10 mm diameter and 0.5 mm depth. Apart from the grooves 119 and 122 and the slots 126 and 127, the free end surface of the tip 117 is machined so as to be flat and smooth. As the case of the embodiment of FIGS. 4(a) and 4(b), the insert 121 terminates short of the free end surface of the tip 117 by a distance of about 0.1 mm (not shown).

Typical examples of resistance sintering operations performed using the above described first electrode in conjunction with the second electrode of FIGS. 6a and 6b and using the sub-electrode 26, and the results therefrom are set forth below.

| MATERIAL | Sub Electrode | PI KPa | P2 KPa | 't' s | Total time s | Current KA | Sinter Weight g | Sinter Thickness mm | Sinter density % |
|---|---|---|---|---|---|---|---|---|---|
| A | EC3 × 4mm | 5517 | — | — | 9 | 32–40 | 51.9 | 4.89 | 87.4 |
| A | EC3 × 4mm | 5517 | — | — | 9 | 32–40 | 52.0 | 5.04 | 86.5 |
| C1 | EC6 × 4mm | 3450 | — | — | 8.5 | 26–32 | 52.6 | 5.39 | 83.8 |
| G | EC6 × 4mm | 8275 | — | — | 7.5 | 31–37 | 41.9 | 5.29 | 82.2 |
| E | EC6 × 4mm | 6897 | — | — | 9 | 26–34 | 45.9 | 5.27 | 85.4 |
| H | EC6 × 4mm | 8275 | — | — | 6 | 15–29 | 26.1 | 3.14 | 76.8 |
| D | EC6 × 4mm | 8275 | 15170 | 1 | 8.5 | 30–38 | 55.0 | 5.50 | 84.0 |
| C1 | EC3 × 4mm | 6205 | — | — | 9 | 30–38 | 51.7 | 5.24 | 84.72 |

Similar results were found to obtain when the graphite (FORDATH EC3) insert 121 was replaced by hot-pressed silicon nitride or sintered silicon aluminium oxynitride as supplied by Lucas Syalon Limited, England.

With the first electrode of FIGS. 7a and 7b it was possible to obtain some reduction of heating time compared to results obtained in Example 4 with the first electrode of FIGS. 4a and 4b. This was due to the reduced contact area between the first electrode and the back plate and consequent reduction in chill effect. However, it is also found that the risk of localised melting is increased.

EXAMPLE 6

A sample of material F, which contains no component expected to produce a substantial liquid phase, was processed as described in Example 5 but with no sub-electrode present, using an initial pressure PI of 800 p.s.i., (5517 KPa), a second pressure P2 of 2200 p.s.i., (15170 KPa), at a time of 6 seconds, a current of 25–36×10³A for a total time of 7.5 seconds. Final overall density was approximatley 75%. However, it was noted that the central portion of the friction material, corresponding to the inserts of the electrodes, was poorly sintered. Although this is not necessarily a disadvantage in a brake pad, it does demonstrate the ability of the centrally disposed insert to control current distribution in this application.

This should be compared with Example 2 where sintering was also effected using no sub-electrode but where the material A was used and which was expected to benefit from considerable liquid phase sintering and hence the central region was adequately sintered. However, as mentioned earlier, in cases where the friction material contains a substantial quantity of liquid phase material, it is preferred that a sub-electrode is used.

I claim:

1. A method of producing a friction element for a motor car or motor cycle disc brake, the friction element including a sintered friction pad (10) bonded to an electrically conductive backing plate (9), and the method comprising the steps of:
   (a) introducing a powdered friction material (14) which, on sintering, will produce the required friction pad (10) into a die cavity defining the shape of the pad, the die cavity being closed at one end by the backing plate (9) and the friction material (14) contacting one major surface of the backing plate (9),
   (b) engaging a first resistance heating electrode (15,115) with the other major surface of the backing plate (9), the first electrode (15,115) contacting the backing plate (9) through an end surface of the electrode which is formed with a recess (18, 118) which is at least partly filled by an insert (21,121) formed of a material which is less electrically conductive than the remainder of the first electrode (15, 115),
   (c) introducing a second resistance heating electrode (16, 116) into the die cavity so that the powdered friction material (14) is contained between, and is in electrical contact with, the first and second electrodes (15, 115 and 16, 116).
   (d) causing the first and second electrodes (15, 115 and 16, 116) to undergo movement relative to and towards each other so as to compress the friction material (14) in the die cavity against the backing plate (9), and
   (e) simultaneously with step (d) passing an electric current between the electrodes (15, 115 and 16, 116) through the backing plate (9) and the friction material (14) to sinter the friction material (14) into the required friction pad (10) and bond the pad (10) to the backing plate (9).

2. A method as claimed in claim 1, wherein the first electrode (15, 115) also has at least one groove (19,22, 119, 122) or slot (126, 127) therein to produce the required heating effect in step (e).

3. A method as claimed in claim 1 or 2, wherein the insert (21, 121) only partly fills the recess (18, 118).

4. A method as claimed in claim 3, wherein the insert (21, 121) terminates short of said end surface of the electrode (15, 115).

5. A method as claimed in claim 3, wherein a groove is provided around the edge of the insert.

6. A method as claimed in claim 1, wherein the second electrode has an end surface which is presented to the friction material, said end surface being planar and unrecessed.

7. A method as claimed in claim 1, wherein the second electrode has an end surface which is presented to the friction material, said end surface being provided with a recess (24, 124) therein, and wherein the recess is completely filled with an insert formed of a material which is less electrically conductive than the remainder of the second electrode.

8. A method as claimed in claim 1, wherein the ratio of the electrical resistance of the insert of the first electrode to that of the remainder of the first electrode is greater than 100:1.

9. A method as claimed in claim 7, wherein the ratio of the electrical resistance of the insert (25, 125) of the second electrode (16, 116) to that of the remainder of the second electrode (16, 116) is greater than 100:1.

10. A method as claimed in claim 1, wherein a sub-electrode (26) is provided between the second electrode (16, 116) and the powdered friction material, the sub-electrode (26) extending over the cross-sectional area of the cavity and being formed of a material which is less electrically conductive than the second electrode (16, 116).

11. A method as claimed in claim 10, wherein the ratio of the electrical resistance of the sub-electrode to that of the second electrode (16, 116) is greater than 50:1.

12. A method as claimed in claim 1, wherein step (d) includes compressing the friction material at a first predetermined pressure for a predetermined period of time and then compressing the friction material at a second predetermined pressure, said second predetermined pressure being higher than said first predetermined pressure.

13. A method as claimed in claim 12, wherein the first predetermined pressure is such that the powdered friction material is compressed so that it has a resistivity of less than 200 milliohm cm.

14. A method as claimed in claim 12 or 13, wherein during application of the second predetermined pressure, the power input is controlled until the resistance of the friction material stabilises, and then the power input and current are reduced.

15. Apparatus for producing a friction element for a motor car or motor cycle disc brake, the friction element including a sintered friction pad (10) bonded to an electrically conductive backing plate (9), said apparatus comprising a die cavity (13) defining the shape of the pad (10) and having one end which is arranged to be closed by the backing plate (9) a first resistance heating electrode (15,115) which is arranged to engage with an opposite major surface of the backing plate (9) to that which faces the die cavity (13); and a second resistance heating electrode (16, 116) having an end surface which is engageable in an opposite end of the die cavity (13) to that which is closed in use by the backing plate (9), the first and second electrodes (15, 115 and 16, 116) being movable relative to and towards each other so as to compress powdered friction material when in the die cavity whilst a current is passed between the electrodes to sinter the friction material into the required pad (10) and bond the pad (10) to the backing plate (9); wherein the first electrode (15, 115) has a backing plate engaging end surface with a recess (18, 118) therein and wherein the recess (18, 118) is at least partially filled by an insert (21, 121) formed of a material which is less electrically conductive than the remainder of the first electrode (15, 115).

16. A friction element for a motor car or motor cycle disc brake, produced by the method as claimed in any one of claims 1, 2, 4, and 6–13.

* * * * *